UNITED STATES PATENT OFFICE.

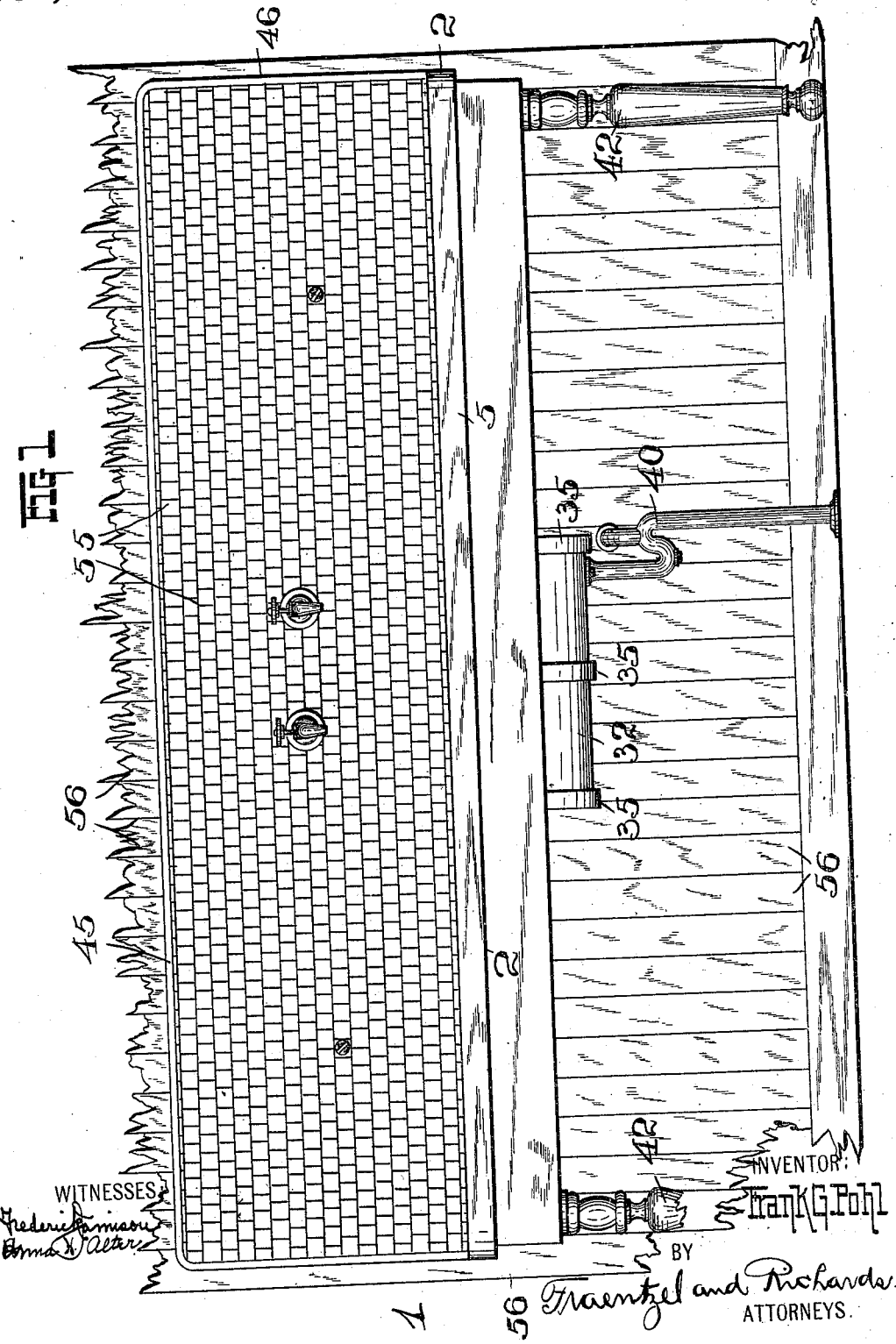

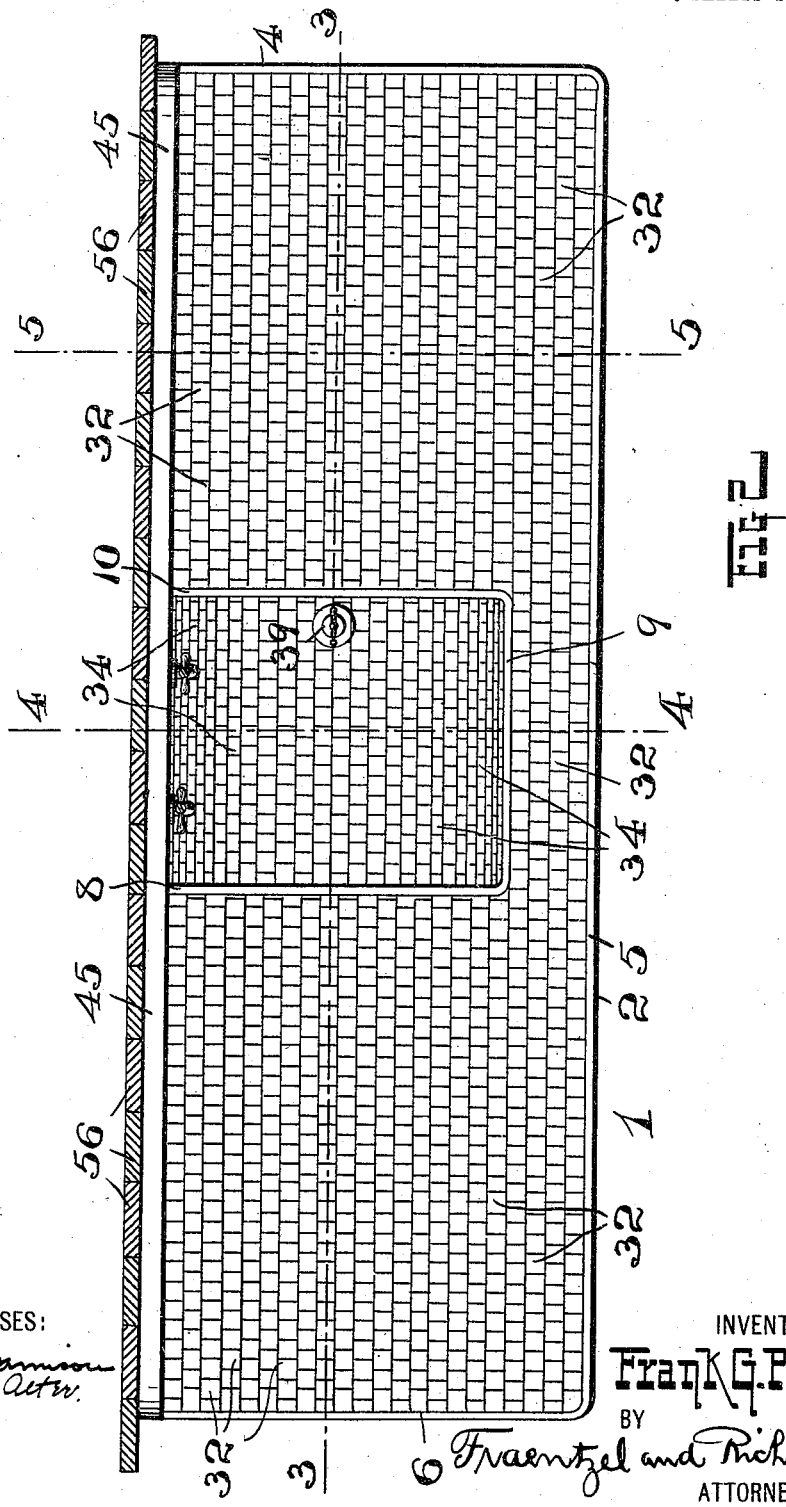

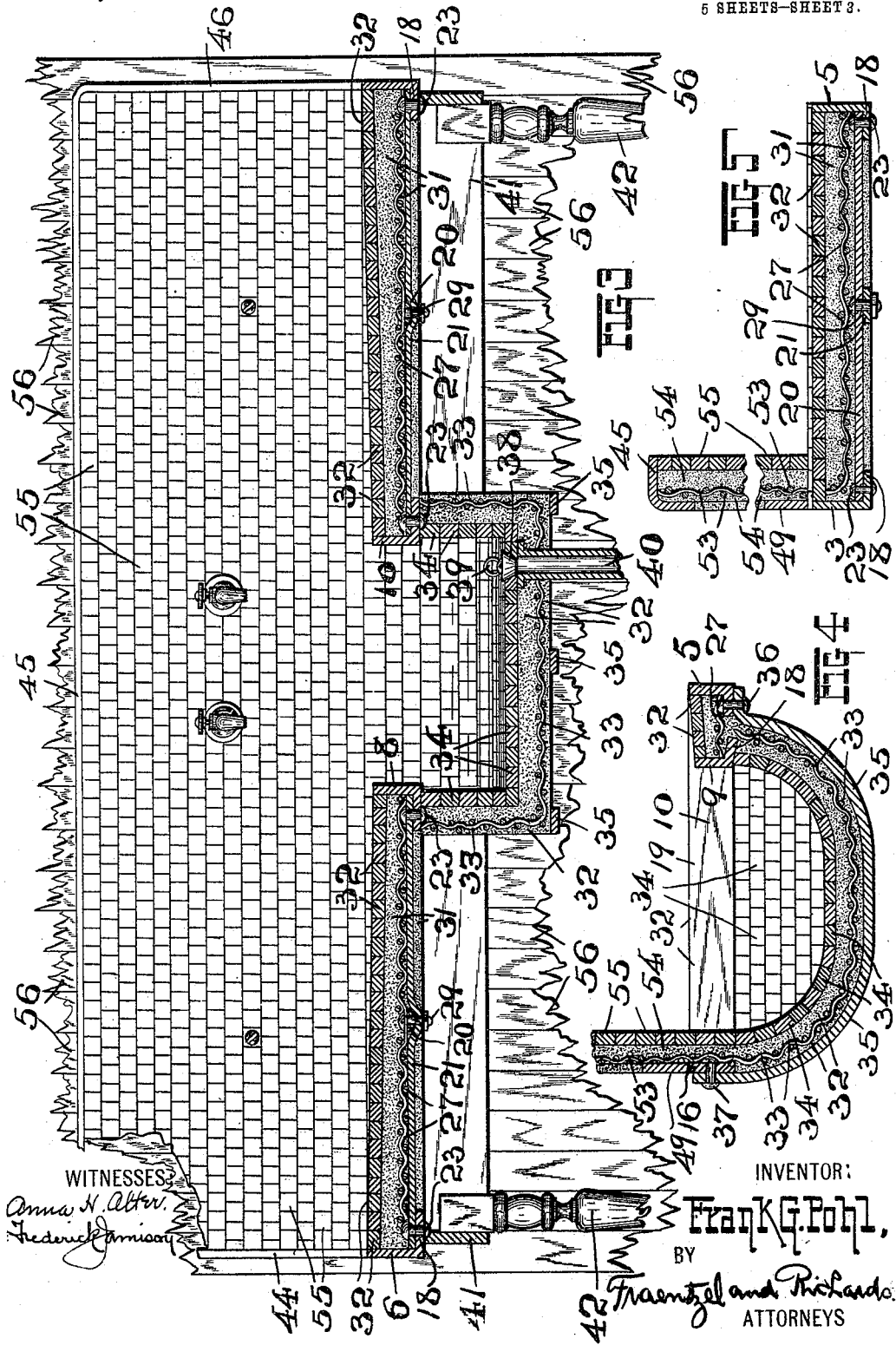

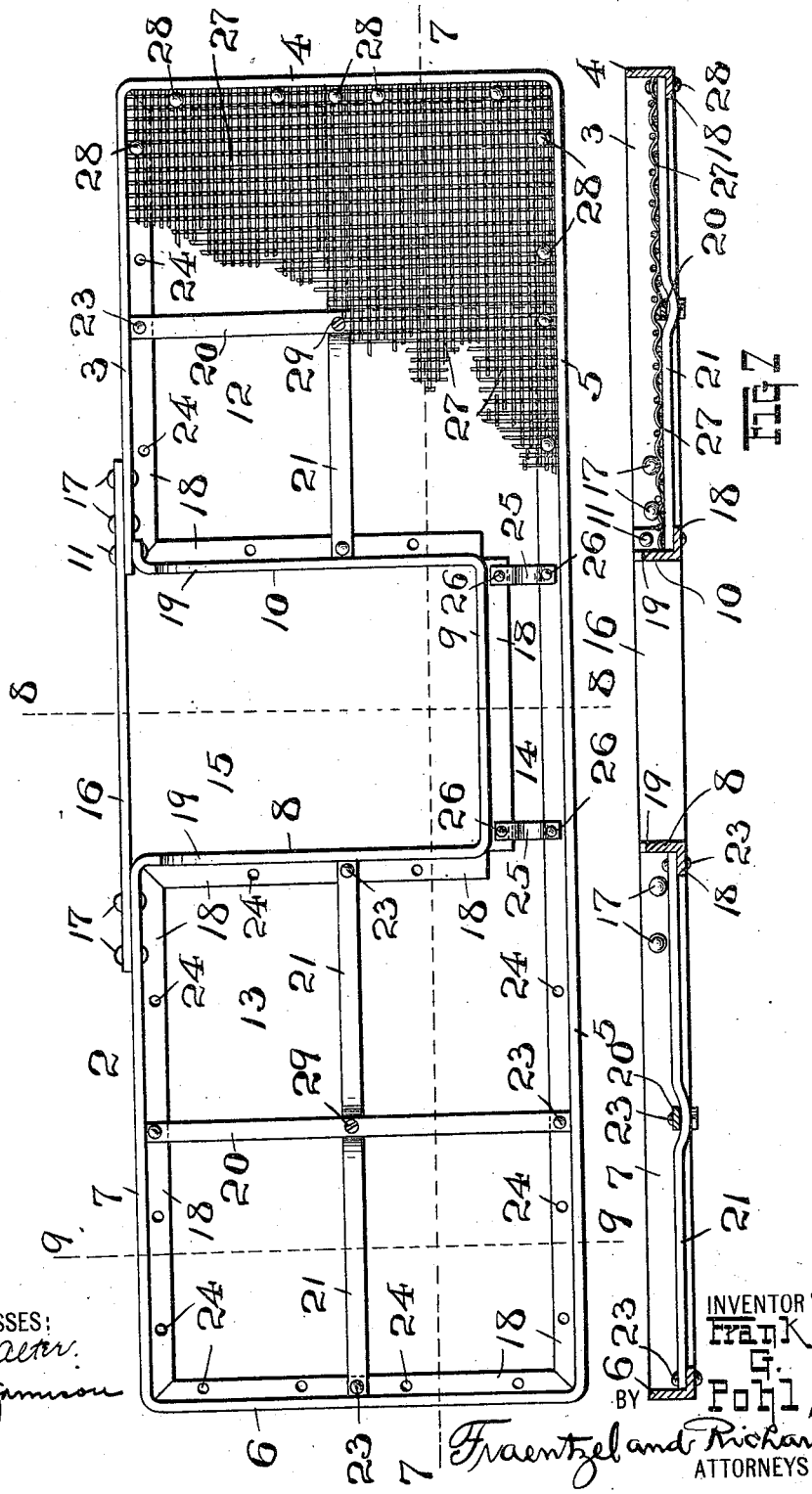

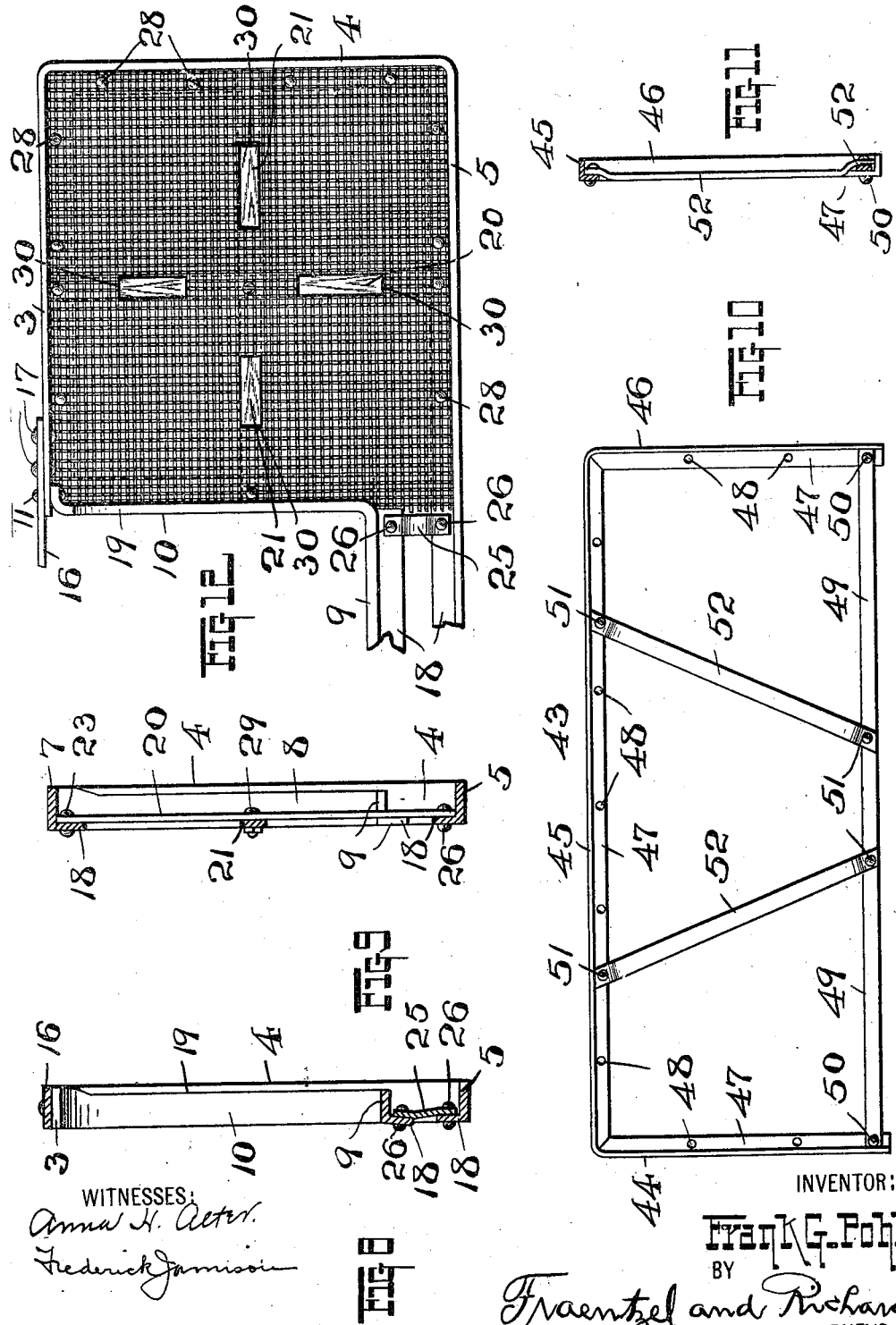

FRANK G. POHL, OF IRVINGTON, NEW JERSEY.

SINK AND SIMILAR WASHBASIN.

983,644.

Specification of Letters Patent.

Patented Feb. 7, 1911.

Application filed February 20, 1907. Serial No. 358,496.

*To all whom it may concern:*

Be it known that I, FRANK G. POHL, a citizen of the United States, residing at Irvington, in the county of Essex and State of New Jersey, have invented certain new and useful Improvements in Sinks and Similar Washbasins; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has reference to improvements in wash-basins, sinks, and the like; and, the invention relates, more particularly to a novel method and construction of tiled wash-basin, sink, and the devices used for similar purposes, such as bath-tubs, vats, etc.

My present invention has for its principal object to provide a novel method and construction of tiled wash-basin, sink, and the like, which shall be of a neat, simple and cheap construction, and which shall be highly ornamental, and perfectly sanitary, because of the fact that the tiled surfaces can be easily kept clean.

Other objects of this invention will be clearly understood from the following detailed description of the invention.

With the various objects of the present invention in view, the invention consists, primarily, in the novel construction of sink or wash-basin hereinafter set forth; and, furthermore, this invention consists in the various arrangements and combinations of devices and parts, as well as in the details of the construction of the same, all of which will be hereinafter more fully described and then finally embodied in the clauses of the claim which are appended to and which form an essential part of this specification.

The invention is clearly illustrated in the accompanying drawings, in which:—

Figure 1 is a front elevation of a sink made according to the principles of the present invention; and Fig. 2 is a top or plan view of the same. Fig. 3 is a longitudinal vertical section, taken on line 3—3 in said Fig. 2; Fig. 4 is a transverse section, taken on line 4—4 in said Fig. 2; and Fig. 5 is a similar section, taken on line 5—5 in the same figure. Fig. 6 is a plan view of the main skeleton or frame of the basin or sink, showing in connection therewith a portion of the wire-screen secured to the said frame, prior to the application of a cement and tiling; and Fig. 7 is a longitudinal section of the same, said section being taken on line 7—7 in said Fig. 6. Fig. 8 is a transverse section of said frame, said section being taken on line 8—8 in Fig. 6; and Fig. 9 is a similar section of the frame, said section being taken on line 9—9 in Fig. 6. Fig. 10 is a face view of the back-frame; and Fig. 11 is a cross-section of the same. Fig. 12 is a top view of the one end-portion of the main frame or skeleton, provided with a supporting screen, and showing a slightly different method of securing the screen in position.

Similar characters of reference are employed in all of the above described views, to indicate corresponding parts.

Referring now to the several figures of the drawings, the reference-character 1 indicates a complete sink which is made according to the principles of the present invention.

The wash-basin or sink-construction in the present case consists, essentially, of a main skeleton or frame 2, which, as will be seen more especially from Fig. 6 of the drawings, is made from band-iron, the frame being preferably made from one continuous piece of iron which is bent to provide the members 3, 4, 5, 6, 7, 8, 9 and 10, rivets 11 being used to secure the ends together, substantially as shown. In this manner, an open or skeleton-frame is produced having the open portions 12, 13, 14 and 15, as clearly indicated in said Fig. 6 of the drawings. The members 3 and 7 of the said main frame are connected and stiffened by means of a band-iron or rod 16, the latter being secured in place by means of rivets 17, and extending across the back of said open space 15, as shown. In cross-section, the said band-iron from which the frame is made is practically L-shaped to provide the several flanges 18 which extend into the respective openings 12, 13 and 14. The upper edges of the parts 8, 9 and 10 are preferably cut down as at 19, see Figs. 6, 7 and 8, for the purposes to be more fully hereinafter described. Extending at right angles across the two openings 12 and 13 are supporting rods or bars 20 and 21, which have their respective ends resting upon the respective flanges 18 and secured thereto by means of pins, rivets or bolts 23. Perforations or openings 24 are also provided in the said flanges 18, for the purposes to be presently described. Short braces 25 extend across the open space 14, said braces being secured to the respective flanges 18, by means of rivets, pins or bolts 26. A suitable wire-mesh or screen 27 is arranged upon the said supporting rods or bars 20 and 21 and supports 25, in such a manner, that the various openings 12, 13 and 14, are entirely covered with the said mesh or wire, the latter having its marginal edges resting upon the various flanges 18, and secured and held in position by means of pins or rivets 28 which are inserted through the perforations 24 in the flanges 18 and then riveted over upon the lower surfaces of the said flanges. The various cross-bars or rods 20 and 21 may be secured together by means of a rivet, bolt or screw 29 at their points of intersection, as clearly indicated.

While in the various figures of the drawings, I have shown the wire-mesh or screen 27 supported upon the larger bars or rods 20 and 21, the said wire screen may be provided with slits or openings 30, so that alternate portions of the screen may be arranged against the opposite faces of said rods or bars 20 and 21, substantially in the manner shown in Fig. 12 of the drawings. Having thus constructed the main supporting frame or skeleton suitable layers of cement 31 are arranged upon opposite sides of the said screen or wire-mesh 27, the cement being laid upon the upper surfaces of the wire-screen sufficiently beneath the upper marginal edges of the various members 3, 4, 5, 6, 7, 8, 9 and 10, that suitable tiles 32 can be laid and allowed to set in the said cement, substantially in the manner shown in several figures of the drawings. In this manner I have produced a simply constructed and ornamental tiled support provided with a pair of draining surfaces or faces, located upon each side of the opening 15.

Referring now to Fig. 3 of the drawings, it will be seen that the tiles 32 which form the draining surfaces or drain-boards of the device are laid at an angle in the cement, so that the highest points of the draining surfaces are located at the marginal edge-portions of the respective members 4 and 6 of the main frame, and the lowest points of said draining surfaces are located at the marginal edges of the respective members 8 and 10 of the main frame, whereby any water upon the draining surfaces will drain off into the opening 15 of the said main frame. Located directly beneath the said opening 15 is a wash-basin, the same being made of any suitable configuration in cross-section and being molded in cement having arranged in the interior thereof a wire-screen 33, substantially as shown in Figs. 3 and 4 of the drawings. The interior surfaces of this cement basin are lined with tiles 34, which are arranged and allowed to set in the cement in the usual manner. The width and breadth of the basin thus formed is preferably made slightly larger than the width and breadth of the opening 15, so that the said basin can be arranged beneath the said opening with its upper marginal edges directly beneath the lower faces of the flanges 18 of the members 8, 9 and 10, of the main frame or skeleton 2, and secured in place by means of suitable bands or straps 35 having their respective end-portions fastened to portions of the member 8 and the back-bar or rod 16 by means of rivets, screws or bolts 36 and 37 respectively. The said basin may be provided in its bottom with a usual outlet opening 38 and stopper 39, a discharge pipe 40 being connected with the said opening 38.

Having thus produced a combined wash-basin and drain therefor, the main frame or skeleton 2, with the various parts connected therewith is arranged upon an open-frame 41 which is supported by means of ornamental legs or supports 42. This support thus provided is preferably made of wood, but the same may be made of metal if desired. To provide the sink or wash-basin with a suitably tiled back-board I have made a frame 43, see Figs. 10 and 11. This frame is made of band-iron and consists of three members 44, 45 and 46, which are bent substantially in the manner shown in Fig. 10 of the drawings, and are formed with inwardly extending flanges 47 which are provided with holes or perforations 48. A lower bar or rod 49 is connected with and secured to the flanges of the end-members 44 and 46 of the frame 43 by means of bolts or rivets 50, and secured to said bar or rod 49 and the flange of the member 45 by means of rivets or bolts 51 may be suitably disposed stiffening bars or stays 52. Suitably secured upon the various flanges of the members 44, 45, 46 and upon the bar 49 and said stays 52 is a wire-mesh or screen 53, see Figs. 4 and 5 of the drawings, said screen being embedded in layers of cement 54, as shown, in which is, also embedded a facing of tile 55. In this manner a rectangular tile back-plate or board is produced, this board being placed on edge along the back edge of the sink and then suitably secured to the facing of the wainscoting or wall 56, as will be clearly evident, from an inspection of Figs. 1, 2 and 3 of the drawings. It will thus be seen that I have produced a neat and ornamental wash-tray, basin or sink which is perfectly sanitary, since owing to the tile-facings, the exposed surfaces can be kept clean without the least exertion, and hence there can be no accumulation of dirt and other obnoxious matter.

From the foregoing description of my present invention, it will be clearly evident that the parts of the metal framework which are exposed to view may be galvanized, nickel-plated, or otherwise plated, if desired. It will also be evident that the general outline of the frame-work and the tile surfaces which form the drains or drip-boards may be varied, without departing from the scope of this invention; and, furthermore, it will also be evident, that the frame-work may be made in such a manner, that the sink will be provided with but one drain or drip-board located upon one side of the wash-basin, in which case the back-frame is correspondingly made to conform to the length of the entire device. It will also be understood, by providing a rectangular metal-frame of band-iron having inwardly extending flanges, with the variously arranged cross-bars or rods and the wire-mesh supported thereon and secured to the flanges, and with the layers of cement and tiling, all arranged and constructed in the manner previously described, that a tiled top is produced which can be used with a support, so as to provide a table for conservatories, or an operating table for hospitals, or for slaughtering and other kindred purposes.

I claim:—

1. In a device of the character set forth, the combination with an open frame-work of metal having inwardly projecting flanges, cross-bars supported upon said flanges, and a net-work of wires supported by said flanges and the cross-bars, of a cement-filling in which said net-work of wires is embedded, and a facing of tiles laid in said cement, substantially as and for the purposes set forth.

2. In a device of the character set forth, the combination with an open frame-work of metal having inwardly projecting flanges, cross-bars supported upon said flanges, and a net-work of wires supported upon said flanges and the cross-bars, of a cement-filling in which said net-work of wires is embedded, and a facing of tiles laid in said cement, all combined with a support on which said frame rests, and legs extending from said support, substantially as and for the purposes set forth.

3. In a device of the character set forth, the combination with a horizontally disposed open frame-work of metal having inwardly projecting flanges, cross-bars supported upon said flanges, and a net-work of wires supported by said flanges and the cross-bars, of a cement-filling in which said net-work of wires is embedded, a facing of tiles laid in said cement, and a second frame of metal vertically disposed along one of the edges of the first-mentioned frame, said second frame having inwardly projecting flanges and a connecting-bar, a series of cross-bars supported upon said flanges and the connecting-bar, a net-work of wires supported by said flanges, said connecting-bar and the cross-bars, a cement-filling in which said net-work of wires is embedded, and a facing of tiles laid in said cement, substantially as and for the purposes set forth.

4. In a device of the character set forth, the combination with a horizontally disposed open frame-work of metal having inwardly projecting flanges, cross-bars supported upon said flanges, and a net-work of wires supported by said flanges and the cross-bars, of a cement filling in which said net-work of wires is embedded, a facing of tiles laid in said cement, and a second frame of metal vertically disposed along one of the edges of the first-mentioned frame, said second frame having inwardly projecting flanges and a connecting-bar, a series of cross-bars supported upon said flanges and the connecting-bar, a net-work of wires supported by said flanges, said connecting-bar and the cross-bars, a cement-filling in which said net-work of wires is embedded, and a facing of tiles laid in said cement, all combined with a support on which said frame rests, and legs extending from said support, substantially as and for the purposes set forth.

5. In a device of the character set forth, the combination with an open frame-work of metal having inwardly projecting flanges, said frame being provided with an open part 15, cross-bars supported upon said flanges, and a net-work of wires supported by said flanges and the cross-bars, of a cement-filling in which said net-work of wires is embedded, a facing of tiling laid in said cement, and a basin secured to said frame beneath said opening 15, said basin being molded in cement, a net-work of wire embedded in said cement, and facings of tiles laid in the inner faces of the basin, substantially as and for the purposes set forth.

6. In a device of the character set forth, the combination with an open frame-work of metal having inwardly projecting flanges, said frame being provided with an open part 15, cross-bars supported upon said flanges, and a net-work of wires supported by said flanges and the cross-bars, of a cement-filling in which said net-work of wires is embedded, a facing of tiling laid in said cement, and a basin secured to said frame beneath said opening 15, said basin being molded in cement, a net-work of wire embedded in said cement, and facings of tiles laid in the inner faces of the basin, all combined with a support on which said frame rests, and legs extending from said support, substantially as and for the purposes set forth.

7. In a device of the character set forth, the combination with an open frame-work of metal having inwardly projecting flanges, said frame being provided with an open part 15, cross-bars supported upon said flanges, and a net-work of wires supported by said flanges and the cross-bars, of a cement-filling in which said net-work of wires is embedded, a facing of tiling laid in said cement, and a basin secured to said frame beneath said opening 15, said basin being molded in cement, a net-work of wire embedded in said cement, and facings of tiles laid in the inner faces of the basin, and a second frame of metal vertically disposed along one of the edges of the first-mentioned frame, said second frame having inwardly projecting flanges and a connecting-bar, a series of cross-bars supported upon said flanges and the connecting-bar, a net-work of wires supported by said flanges, said connecting-bar and the cross-bars, a cement-filling in which said net-work of wires is embedded, and a facing of tiles laid in said cement, substantially as and for the purposes set forth.

8. In a device of the character set forth, the combination with an open frame-work of metal having inwardly projecting flanges, said frame being provided with an open part 15, cross-bars supported upon said flanges, and a net-work of wires supported by said flanges and the cross-bars, of a cement-filling in which said net-work of wires is embedded, a facing of tiling laid in said cement, and a basin secured to said frame beneath said opening 15, said basin being molded in cement, a net-work of wire embedded in said cement, and facings of tiles laid in the inner faces of the basin, and a second frame of metal vertically disposed along one of the edges of the first-mentioned frame, said second frame having inwardly projecting flanges and a connecting-bar, a series of cross-bars supported upon said flanges and the connecting-bar, a net-work of wires supported by said flanges, said connecting-bar and the cross-bars, a cement-filling in which said net-work of wires is embedded, and a facing of tiles laid in said cement, all combined with a support on which said frame rests, and legs extending from said support, substantially as and for the purposes set forth.

9. In a sink of the character set forth, a main frame made of band-iron, having inwardly projecting flanges, said frame being bent to form openings 12, 13, 14 and 15, cross-bars extending across the openings 12 and 13, said bars having their ends supported upon said flanges, stays extending across the opening 14, said stays having their ends supported upon said flanges, a net-work of wires in said openings 12, 13 and 14, said net-work of wires being supported upon said flanges, cross-bars and stays, fillings of cement in said openings 12, 13 and 14 in which the net-work of wires is embedded, facings of tiles laid in said cement, and a basin secured to said main frame beneath said opening 15, said basin being molded in cement, a net-work of wires embedded in said cement, and facings of tiles laid in the inner faces of the basin, substantially as and for the purposes set forth.

10. In a sink of the character set forth, a main frame made of band-iron, having inwardly projecting flanges, said frame being bent to form openings 12, 13, 14 and 15, cross-bars extending across the openings 12 and 13, said bars having their ends supported upon said flanges, stays extending across the opening 14, said stays having their ends supported upon said flanges, a net-work of wires in said openings 12, 13 and 14, said net-work of wires being supported upon said flanges, cross-bars and stays, fillings of cement in said openings 12, 13 and 14 in which the net-work of wires is embedded, facings of tiles laid in said cement, and a basin secured to said main frame beneath said opening 15, said basin being molded in cement, a net-work of wires embedded in said cement, and facings of tiles laid in the inner faces of the basin, all combined with a support on which said frame rests, and legs extending from said support, substantially as and for the purposes set forth.

11. In a sink of the character set forth, a main frame made of band-iron, having inwardly projecting flanges, said frame being bent to form openings 12, 13, 14 and 15, cross-bars extending across the openings 12 and 13, said bars having their ends supported upon said flanges, stays extending across the opening 14, said stays having their ends supported upon said flanges, a net-work of wires in said openings 12, 13 and 14, said net-work of wires being supported upon said flanges, cross-bars and stays, fillings of cement in said openings 12, 13 and 14 in which the net-work of wires is embedded, facings of tiles laid in said cement, and a basin secured to said main frame beneath said opening 15, said basin being molded in cement, a net-work of wires, embedded in said cement, and facings of tiles laid in the inner faces of the basin, and a second frame of metal vertically disposed along one of the edges of the main frame, said second frame having inwardly projecting flanges and a connecting-bar, a series of cross-bars supported upon said flanges and the connecting-bar, a net-work of wires supported by said flanges, said connecting-bar and the cross-bars, a cement-filling in which said net-work of wires is embedded, and a facing of tiles laid in said cement, substantially as and for the purposes set forth.

12. In a sink of the character set forth, a main frame made of band-iron, having inwardly projecting flanges, said frame being bent to form openings 12, 13, 14 and 15, cross-bars extending across the openings 12 and 13, said bars having their ends supported upon said flanges, stays extending across the opening 14, said stays having their ends supported upon said flanges, a net-work of wires in said openings 12, 13 and 14, said net-work of wires being supported upon said flanges, cross-bars and stays, fillings of cement in said openings 12, 13 and 14 in which the net-work of wires is embedded, facings of tiles laid in said cement, and a basin secured to said main frame beneath said opening 15, said basing being molded in cement, a net-work of wires embedded in said cement, and facings of tiles laid in the inner faces of the basin, and a second frame of metal vertically disposed along one of the edges of the main frame, said second frame having inwardly projecting flanges and a connecting-bar, a series of cross-bars supported upon said flanges and the connecting bar, a net-work of wires supported by said flanges, said connecting-bar and the cross-bars, a cement-filling in which said net-work of wires is embedded, and a facing of tiles laid in said cement, all combined with a support on which said frame rests, and legs extending from said support, substantially as and for the purposes set forth.

In testimony, that I claim the invention set forth above I have hereunto set my hand this sixteenth day of February, 1907.

FRANK G. POHL.

Witnesses:
FREDK. C. FRAENTZEL,
FREDERICK JAMISON.